Sept. 1, 1936.　　　　F. H. OWENS　　　　2,052,792
MOTION PICTURE APPARATUS
Filed Sept. 9, 1929
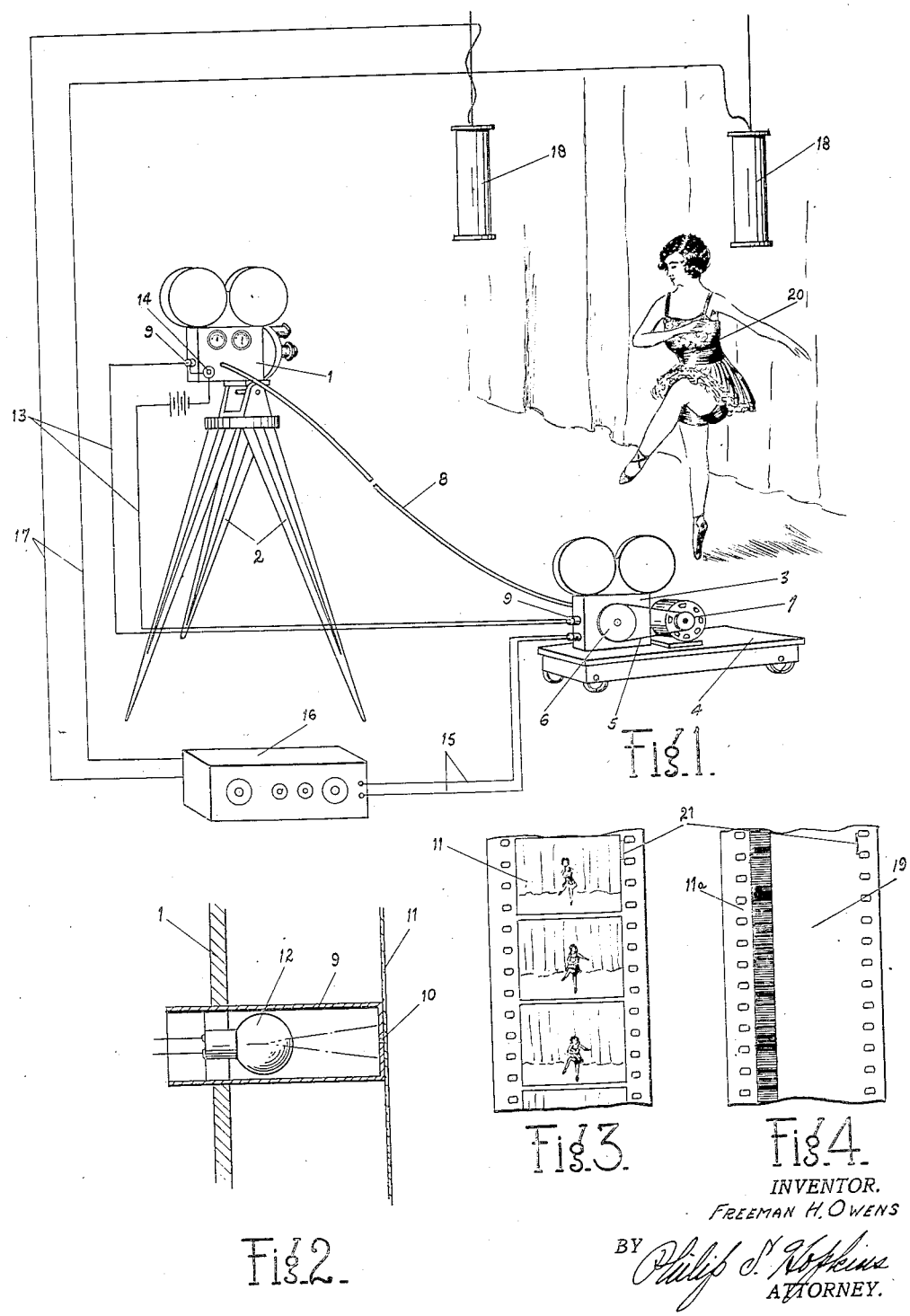
INVENTOR.
FREEMAN H. OWENS
BY Philip S. Hopkins
ATTORNEY.

Patented Sept. 1, 1936

2,052,792

UNITED STATES PATENT OFFICE 2,052,792

MOTION PICTURE APPARATUS

Freeman H. Owens, New York, N. Y.

Application September 9, 1929, Serial No. 391,382

6 Claims. (Cl. 88—16.2)

This invention relates to improvements in talking motion picture apparatus, the principal object of the invention being to provide efficient means for indicating a position of synchronism between a picture film and a corresponding sound film.

A further object of the invention is to provide a motion picture camera and a sound recording camera coupled together for operation by a single motor and at the same time capable of changing their positions relatively to each other.

Another object lies in the provision of means controlled by the operator during the taking of a motion picture and sound record for simultaneously marking the picture film and sound film in a manner useful to the editor, printer and projectionist of the films subsequent to their original taking and recording.

Other objects and advantages will appear as the description proceeds.

In the drawing accompanying this specification,

Figure 1 is a diagrammatic side view illustrating an apparatus embodying the features of the present invention.

Figure 2 is a detail sectional view illustrating a lamp housing forming one of the features of the invention.

Figures 3 and 4 are fragmentary views of films on which records have been made respectively in the picture camera and the sound camera.

Referring to the drawing, 1 designates a motion picture camera mounted on the usual tripod 2, and 3 designates a sound camera mounted for portability on a movable platform or truck 4. The sound camera 3 may be driven by a belt 5 and pulley 6 from a motor 7 mounted on the platform 4, and motion may be transmitted from said sound camera to the picture camera 1 by means of a flexible shaft 8.

Mounted in each of the cameras 1 and 3 is a lamp housing 9, which is entirely light-tight excepting that a small slit 10 is formed in its forward or innermost end, which end is so disposed in the cameras that the films 11 and 11a traveling through the picture camera and sound camera respectively will pass adjacent to said end so as to expose a small portion of the films preferably at the extreme edge thereof, to said slit. Within each housing 9 is a lamp 12 adapted to project rays of light through the slit 10, the lamps in the two housings being connected in series by wires 13 and a push button switch 14 being provided in the circuit, whereby the said circuit may be closed at the will of the operator for simultaneously illuminating the slits in both lamp housings.

For convenience the switch 14 may be located on the picture camera 1.

The sound camera 3 is connected by wires 15 with the output of an amplifier 16, the input of which is connected by wires 17 with microphones 18 suitably placed for recording on the film 11a traveling through the sound camera 3 the sounds produced by a performer 20 in the usual manner.

The operation of the apparatus is as follows:—
The cameras 1 and 3 having been properly placed and the operation of the motor started, the sound camera being portable as shown to permit moving around to the most advantageous position, as soon as the cameras are operating at the proper speed and the recording of the picture and sound is ready to begin, the operator momentarily closes the circuit through the lamps 12 by pushing the switch button 14, whereupon the lamps in both cameras will emit light rays through the slits 10 and produce on the edge of each film a small fog area 21, thus marking the starting point of both films, or of a particular scene of the talking picture being produced, which marking will considerably facilitate the matching and synchronizing of the films in the later operations of editing, printing and threading for reproduction.

I claim:—

1. In combination, a motion picture camera, a separate sound recording camera, said cameras being independently movable for selective positioning, means for operating said cameras synchronously, each camera having a film traveling therethrough, and means for selectively and simultaneously marking the films of both cameras to indicate corresponding points on said films.

2. In combination, a motion picture camera, a separate sound recording camera, said cameras being independently movable for selective positioning, means for operating said cameras synchronously, each camera having a film traveling therethrough, and means for selectively and simultaneously marking the films of both cameras to indicate corresponding points on said films, said marking means comprising a light exposure device in each camera and a common operating means therefor.

3. In combination, a motion picture camera, a separate sound recording camera, said cameras being independently movable for selective positioning, means for operating said cameras synchronously, each camera having a film traveling therethrough, a lamp in each of said cameras, means for selectively and simultaneously closing a circuit through both of said lamps, and means for admitting a small portion of light from each lamp to its companion film thereby to simultaneously fog said films at predetermined points.

4. In combination, a motion picture camera, a separate sound recording camera, said cameras being independently movable for selective positioning, means for operating said cameras synchronously, each camera having a film traveling therethrough, a closed housing in each of said cameras and having an end wall provided with a slit disposed adjacent to and in parallelism with the film, a lamp in each of said housings, said lamps being connected in normally open circuit, and means for selectively and momentarily closing said circuit thereby to cause said lamps simultaneously to emit rays through their respective slits on their companion films.

5. In combination a plurality of separate and independent film recorders adapted for making simultaneous records, each of said recorders having means for making reference marks during the recording process on the associated film independent of the record made thereon, and means for controlling the simultaneous operation of all of said marking means at the will of the operator.

6. In combination a plurality of separate and independent film recorders adapted for simultaneous operation, each recorder having film marking means comprising a source of light arranged to expose a marginal portion of the film in a narrow band between the record and the adjacent edge of the film and shielded from exposing the remaining portion thereof, an energizing circuit for said light sources, and a manually operable switch for controlling said circuit.

FREEMAN H. OWENS.